(12) United States Patent
Arora et al.

(10) Patent No.: US 12,135,805 B2
(45) Date of Patent: Nov. 5, 2024

(54) AUTHORIZING APPLICATION ACCESS VIA CUSTOM UWP SID

(71) Applicant: Dell Products L.P., Round Rock, TX (US)

(72) Inventors: Mohit Arora, Austin, TX (US); Danilo O. Tan, Austin, TX (US); Zheng Yuan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 466 days.

(21) Appl. No.: 17/384,548

(22) Filed: Jul. 23, 2021

(65) Prior Publication Data

US 2023/0026040 A1 Jan. 26, 2023

(51) Int. Cl.
*G06F 21/62* (2013.01)
*G06F 9/54* (2006.01)
*G06F 21/60* (2013.01)
*G06F 21/71* (2013.01)

(52) U.S. Cl.
CPC ............ *G06F 21/606* (2013.01); *G06F 9/542* (2013.01); *G06F 21/6281* (2013.01); *G06F 21/71* (2013.01); *G06F 2221/2141* (2013.01)

(58) Field of Classification Search
CPC .... G06F 21/606; G06F 9/542; G06F 21/6281; G06F 21/71; G06F 2221/2141; G06F 9/547
See application file for complete search history.

(56) References Cited

U.S. PATENT DOCUMENTS

| | | | | |
|---|---|---|---|---|
| 2013/0061316 A1* | 3/2013 | Iskin | ............... | G06F 21/53 726/18 |
| 2018/0285554 A1* | 10/2018 | Biswas | ............... | G06F 21/6281 |
| 2020/0021595 A1* | 1/2020 | Sanaullah | ............... | H04L 41/28 |

* cited by examiner

*Primary Examiner* — Izunna Okeke
(74) *Attorney, Agent, or Firm* — Jackson Walker L.L.P.

(57) ABSTRACT

An information handling system may include at least one processor and a non-transitory, computer-reading medium having instructions thereon that are executable by the at least one processor for: providing access to one or more objects via a plurality of application programming interface (API) endpoints; receiving a call to a particular API endpoint from an app; and determining, based on a security identifier (SID) of the app, whether the call should be allowed; wherein the SID of the app is based on one or more custom capabilities defined in a manifest of the app.

9 Claims, 3 Drawing Sheets

AUTHORIZING APPLICATION ACCESS VIA CUSTOM UWP SID

TECHNICAL FIELD

The present disclosure relates in general to information handling systems, and more particularly to managing what resources applications can access in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Embodiments of this disclosure relate to a programming model referred to as Universal Windows Platform (UWP), which is significantly different from the legacy Win32 programming model. Both programming models (UWP and Win32) now co-exist. This poses security concerns, as the Win32 security model is in conflict with the new security controls introduced by the sandboxed environment of UWP.

Many new applications ("apps") are now being developed using UWP. In designing these types of applications, there are cases in which a UWP app should be granted a specific level of access or authorization to a system object such as a service. Although traditional authorization mechanisms such as access control lists (ACLs) have been enhanced to support UWP security measures (e.g. Custom Capabilities), they are limited in scope to only provide a binary level (either allow or deny) of restrictions to the UWP apps. These mechanisms are not able to support the more granular levels of permissions to access a resource which traditional ACLs provide, such as read-only, write-only, read/write, ownership, etc. without incurring additional performance and resource impacts.

For example, the problem could be addressed by creating a large number of different service endpoints, each with its own set of allow/deny permissions. But the creation of so many different endpoints is cumbersome, and it further increases complexity for the apps, which would then need to determine which services to access in which circumstances. It is more desirable to have an endpoint that is configured to allow different types of access dependent upon the identity of the app calling into it.

The lack of granularity in access control is problematic for several reasons. For example, a given service typically has many more capabilities than what may be needed by a given app. But in existing solutions, once the app has been granted access, it has access to all of those capabilities. If the app becomes compromised, this grant of unnecessary access can exacerbate the problem. Accordingly, embodiments of this disclosure may allow a service to provide granular control over what interfaces a given app can access, limiting the app's access to just the interfaces that are needed by that app.

Embodiments of this disclosure may use a Custom-Capability-derived Security Identifier (SID) to enable granular authorization permissions for multiple UWP applications connecting to a single Remote Procedure Call (RPC) endpoint. In general, the term SID refers to a unique, immutable identifier of a user, user group, or other security principal within the context of an operating system (OS) such as Windows.

Capabilities in general may be declared in an app's package manifest to access application programming interfaces (APIs) or resources, such as pictures, music, or devices such as the camera or the microphone. Custom capabilities are used by certain APIs.

Embodiments of this disclosure may allow an endpoint to determine the identity of the app that is attempting to connect. The endpoint may then determine the appropriate permissions for that app based on its identity.

It is to be noted that various terms discussed herein are described in the Microsoft® Reference for Universal Windows Platform (UWP) apps (hereinafter, UWP API Reference), which is hereby incorporated by reference in its entirety. One of ordinary skill in the art with the benefit of this disclosure will understand its applicability to other specifications (e.g., prior or successor versions of the UWP API Reference). Further, some embodiments may be applicable to different technologies other than UWP.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with application resource access management in information handling systems may be reduced or eliminated.

In accordance with embodiments of the present disclosure, an information handling system may include at least one processor and a non-transitory, computer-reading medium having instructions thereon that are executable by the at least one processor for: providing access to one or more objects via a plurality of application programming interface (API) endpoints; receiving a call to a particular API endpoint from an app; and determining, based on a security identifier (SID) of the app, whether the call should be allowed; wherein the SID of the app is based on one or more custom capabilities defined in a manifest of the app.

In accordance with these and other embodiments of the present disclosure, a method may include an information handling system providing access to one or more objects via a plurality of application programming interface (API) endpoints; the information handling system receiving a call to a particular API endpoint from an app; and the information handling system determining, based on a security identifier (SID) of the app, whether the call should be allowed;

wherein the SID of the app is based on one or more custom capabilities defined in a manifest of the app.

In accordance with these and other embodiments of the present disclosure, an article of manufacture may include a non-transitory, computer-readable medium having computer-executable code thereon that is executable by a processor of an information handling system for: providing access to one or more objects via a plurality of application programming interface (API) endpoints; receiving a call to a particular API endpoint from an app; and determining, based on a security identifier (SID) of the app, whether the call should be allowed; wherein the SID of the app is based on one or more custom capabilities defined in a manifest of the app.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
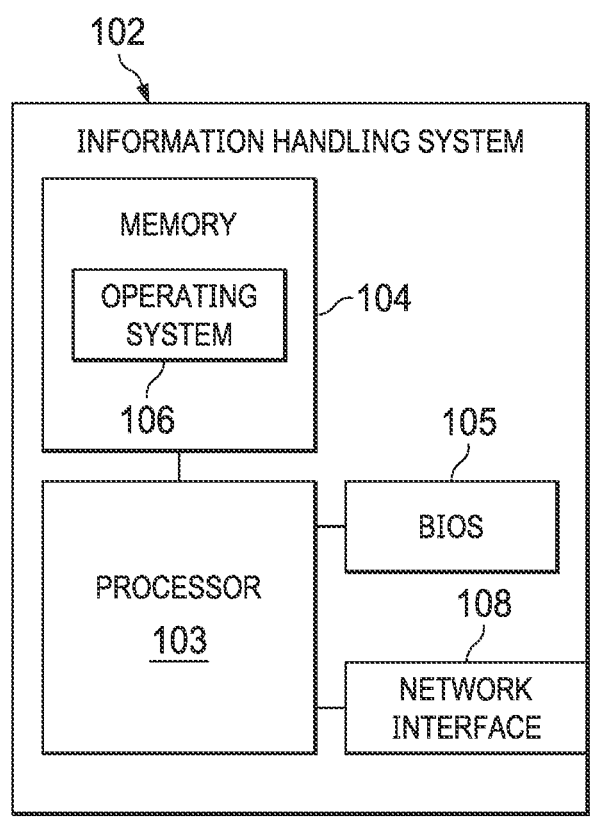
FIG. 1 illustrates a block diagram of an example information handling system, in accordance with embodiments of the present disclosure.
Figure 2:
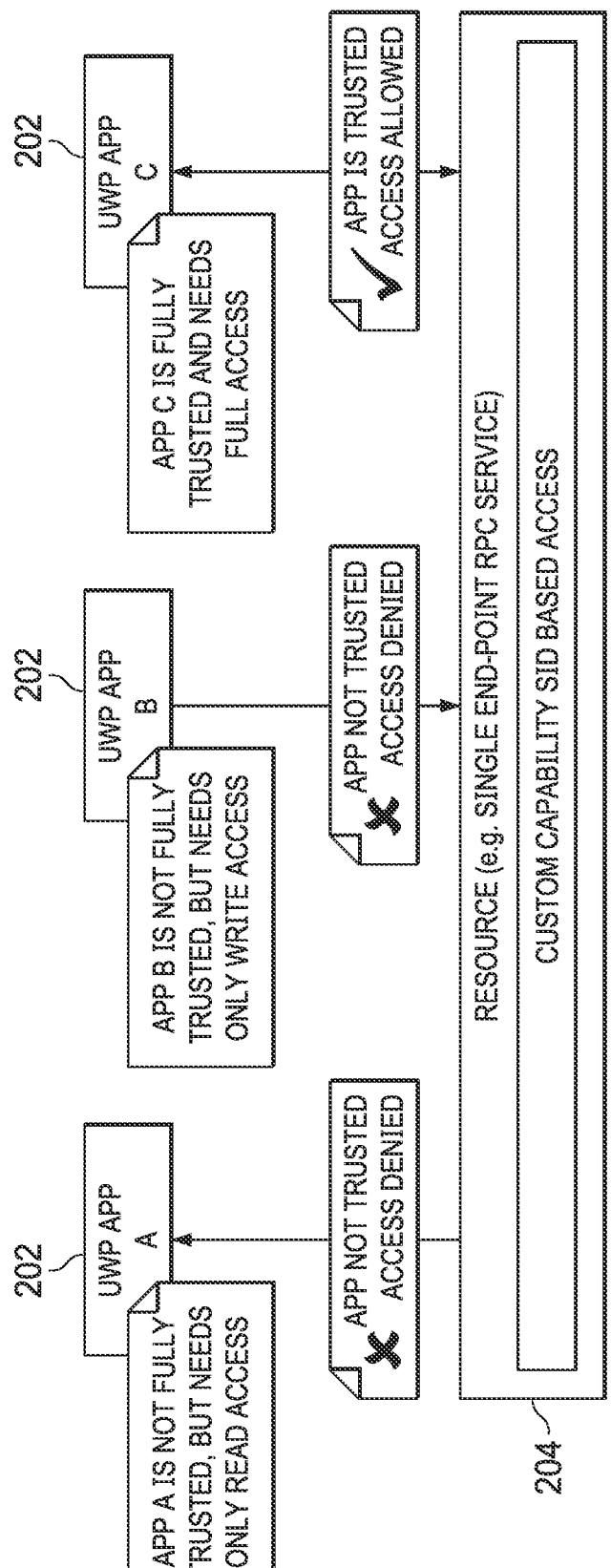
FIG. 2 illustrates a block diagram of multiple apps attempting to access a resource, in accordance with embodiments of the present disclosure.
Figure 3:
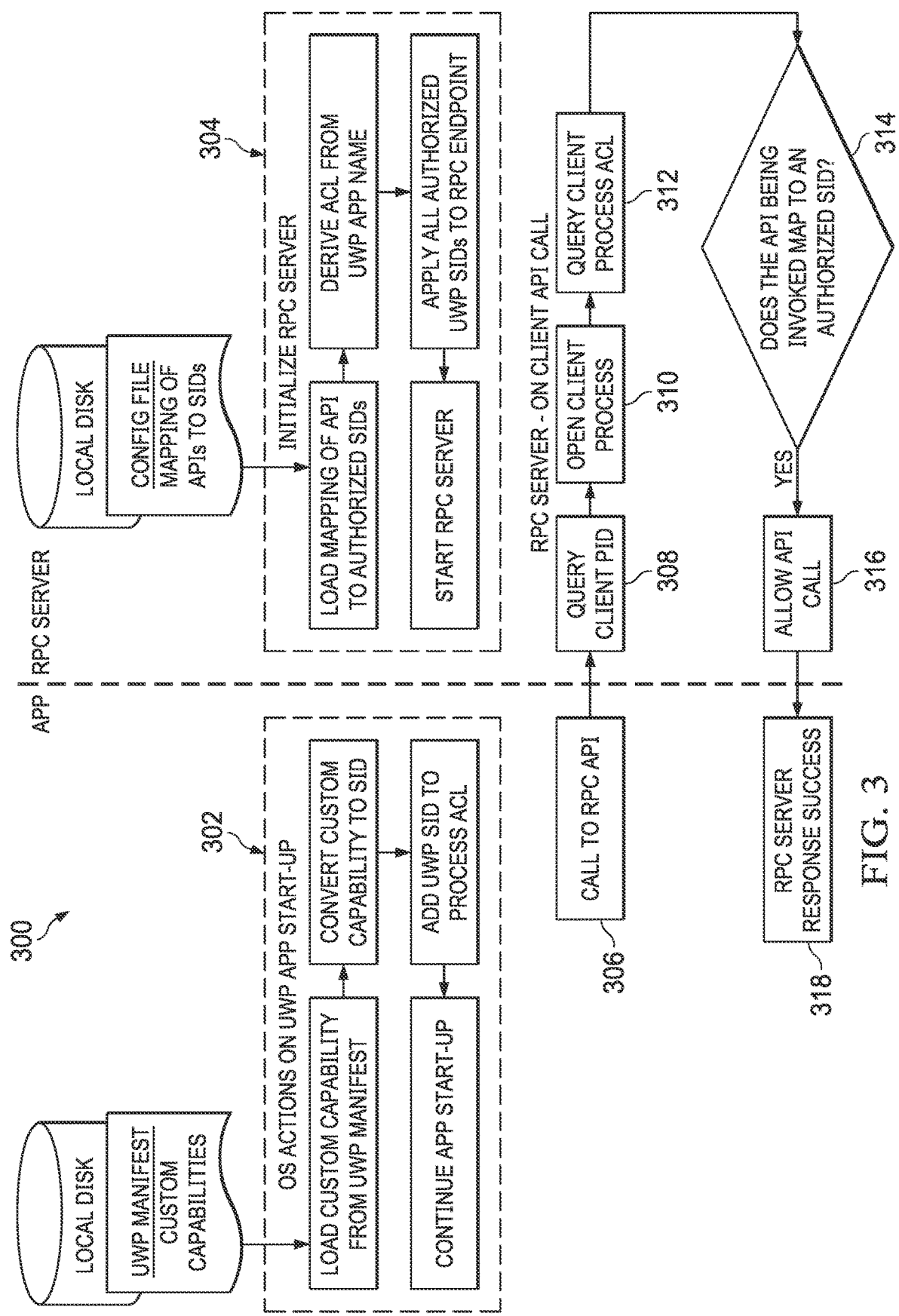
FIG. 3 illustrates an example process flow, in accordance with embodiments of the present disclosure.

Preferred embodiments and their advantages are best understood by reference to FIGS. 1 through 3, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, difficulties exist in controlling access to service endpoints by UWP apps. FIG. 2 illustrates an example of the type of difficulty that may arise, in one embodiment.

Various UWP apps 202 need some level of access to resource 204. Apps A and B are not fully trusted, and so even though they only need limited access, they are denied access. App C is fully trusted and requests full access, which is granted.

At a high level, embodiments of this disclosure may operate by generating a SID for an app, and the RPC service may determine based on that SID what permissions the app should be granted. The SID may be the same for all instances of the app, and it may be generated based on the custom capability/capabilities defined for that app. In general, custom capabilities may be created, cryptographically signed, and added to the app's manifest via the use of a signed custom capability descriptor (SCCD) file. A SID may then be generated by the OS that is based on the custom capabilities in the app's manifest.

Embodiments of this disclosure may allow for a mapping between API endpoints and SIDs. A service may thus implement permission functionality based on the app's SID. For example, a service might grant permissions X and Z to a particular SID, permissions Y and Z to a different SID, etc. This is in contrast to the current situation in which, once an app has been granted access to a particular service, it necessarily has access to all functionality of that service.

In general, all Windows objects (e.g., files, Named Pipes, RPCs, etc.) may have ACLs associated with them. If an object has the UWP_CC_SID (UWP Custom Capability Security Identifier) in the ACL list, then this can be leveraged to allow or restrict access to and from those objects. For example, a UWP process may connect to a Win32 service via a Hardware Support App RPC (HSA-RPC) interface. The HSA-RPC is an OS-provided method to communicate between a pure UWP process and a Win32 process (e.g., a Win32 Windows Service). This technique may be used to access hardware resources such as cameras, microphones, etc. in some embodiments.

On an RPC connection to a Windows service, the Windows service may need to inspect the calling process's ACL list to query the list of UWP_CC_SIDs. The SIDs in the ACL list must match the ones that the Windows service may calculate using the DeriveCapabilitySidsFromName( ) API. This allows the Windows service to grant specific access to respective RPC endpoint APIs based on a predefined authorization mapping of APIs to SIDs.

In particular, the HSA-RPC Server may apply the UWP_CC_SIDs as per OS requirements. A mapping table of UWP_CC_SIDs to RPC APIs may be created based on authorization levels, which may be tuned based on a risk analysis of the feature requirements. On RPC API calls, the service may query the calling process's ACL with SIDs to verify if the API being invoked is mapped to a SID that is listed in the queried list from the UWP process. If not, then the API invocation may be rejected.

Turning now to FIG. 3, an example method 300 is shown for accessing an RPC server endpoint from a UWP app RPC client, according to some embodiments.

At step 302, the OS may take various actions when the UWP app starts up. The OS may load (e.g., from a local disk) custom capabilities for the app from the app's UWP manifest. The OS may then convert the custom capability into a SID and add the UWP SID to the process's ACL. App startup may then continue.

Meanwhile, the Windows service (RPC server) may be initialized as well. A configuration file may specify a mapping of APIs to authorized SIDs, and this may be loaded (e.g., from a local disk). The RPC server may derive an ACL from the name of the UWP app and apply all authorized UWP SIDs to the RPC endpoints. The RPC server may then continue startup.

When the app attempts to interact with the RPC server by calling an RPC API at step 306, the server may query the client's process ID (PID) at step 308. The RPC server may open the calling client process at step 310 and query its ACL at step 312. If the API being invoked maps to an authorized SID at step 314, then the call may be allowed at step 316. If not, the call may fail. The RPC server may then respond successfully to the UWP app at step 318.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    at least one processor; and
    a non-transitory, computer-readable medium having instructions thereon that are executable by the at least one processor for:
    providing access to one or more objects via a plurality of application programming interface (API) endpoints, wherein the one or more objects are Win32 services;
    receiving a call to a particular API endpoint from an app, wherein the app is a Universal Windows Programming (UWP) app; and
    determining, based on a security identifier (SID) of the app, whether the call should be allowed, wherein the determining includes querying a process associated with the app to determine an access control list (ACL) associated with the app to verify that the particular API endpoint is mapped to an SID included in the ACL;
    wherein the SID of the app is based on one or more custom capabilities defined in a manifest of the app.

2. The information handling system of claim 1, wherein the app executes on the information handling system.

3. The information handling system of claim 1, wherein the one or more objects are configured to provide access to a hardware device of the information handling system, the hardware device including a camera and/or a microphone.

4. A method comprising:
    an information handling system providing access to one or more objects via a plurality of application programming interface (API) endpoints, wherein the one or more objects are Win32 services;
    the information handling system receiving a call to a particular API endpoint from an app, wherein the app is a Universal Windows Programming (UWP) app; and
    the information handling system determining, based on a security identifier (SID) of the app, whether the call should be allowed, wherein the determining includes querying a process associated with the app to determine an access control list (ACL) associated with the app to verify that the particular API endpoint is mapped to an SID included in the ACL;
    wherein the SID of the app is based on one or more custom capabilities defined in a manifest of the app.

5. The method of claim 4, wherein the app executes on the information handling system.

6. The method of claim 4, wherein the one or more objects are configured to provide access to a hardware device of the information handling system, the hardware device including a camera and/or a microphone.

7. An article of manufacture comprising a non-transitory, computer-readable medium having computer-executable code thereon that is executable by a processor of an information handling system for:
    providing access to one or more objects via a plurality of application programming interface (API) endpoints, wherein the one or more objects are Win32 services;
    receiving a call to a particular API endpoint from an app, wherein the app is a Universal Windows Programming (UWP) app; and
    determining, based on a security identifier (SID) of the app, whether the call should be allowed, wherein the determining includes querying a process associated with the app to determine an access control list (ACL) associated with the app to verify that the particular API endpoint is mapped to an SID included in the ACL;
    wherein the SID of the app is based on one or more custom capabilities defined in a manifest of the app.

8. The article of claim 7, wherein the app executes on the information handling system.

9. The article of claim 7, wherein the one or more objects are configured to provide access to a hardware device of the information handling system, the hardware device including a camera and/or a microphone.

* * * * *